US012756097B2

(12) United States Patent
Kwon

(10) Patent No.: US 12,756,097 B2
(45) Date of Patent: Oct. 6, 2026

(54) VEHICLE ANTENNA

(71) Applicants: Hyundai Motor Company, Seoul (KR); Kia Corporation, Seoul (KR)

(72) Inventor: Ohyun Kwon, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 85 days.

(21) Appl. No.: 18/793,600

(22) Filed: Aug. 2, 2024

(65) Prior Publication Data

US 2025/0273860 A1 Aug. 28, 2025

(30) Foreign Application Priority Data

Feb. 23, 2024 (KR) ........................ 10-2024-0026236

(51) Int. Cl.

*H01Q 5/307* (2015.01)
*H01Q 1/12* (2006.01)
*H01Q 1/32* (2006.01)

(52) U.S. Cl.

CPC .......... *H01Q 5/307* (2015.01); *H01Q 1/1271* (2013.01); *H01Q 1/3275* (2013.01)

(58) Field of Classification Search

CPC ..... H01Q 5/307; H01Q 1/1271; H01Q 1/3275
See application file for complete search history.

(56) References Cited

U.S. PATENT DOCUMENTS 5,933,119 A * 8/1999 Fujii .................... H01Q 1/1278
343/704

FOREIGN PATENT DOCUMENTS

| | | | | |
|---|---|---|---|---|
| EP | 1088364 B1 * | 8/2006 | ........... | H01Q 1/1285 |
| JP | 2005142616 A * | 6/2005 | ........... | H01Q 1/1271 |
| KR | 20160023744 A * | 3/2016 | ............. | H01Q 1/325 |

* cited by examiner

*Primary Examiner* — Seung H Lee
(74) *Attorney, Agent, or Firm* — MORGAN, LEWIS & BOCKIUS LLP

(57) ABSTRACT

A vehicle antenna includes: a glass antenna provided on a rear glass of a vehicle to transmit and receive a wireless signal; a roof antenna provided at an end portion of a roof panel of the vehicle to transmit and receive a wireless signal; and a transparent conductive film attached to the roof panel opposite to the roof antenna and including a pattern formed thereon to improve coupling between the glass antenna and the roof antenna.

5 Claims, 7 Drawing Sheets

VEHICLE ANTENNA

CROSS-REFERENCE TO RELATED APPLICATION

The present application claims priority to Korean Patent Application No. 10-2024-0026236 filed on Feb. 23, 2024, the entire contents of which is incorporated herein for all purposes by this reference.

BACKGROUND OF THE PRESENT DISCLOSURE

Field of the Present Disclosure

The present disclosure relates to a vehicle antenna capable of improving antenna radiation performance while maintaining a typical vehicle antenna package and design.

Description of Related Art

As communication devices develop, antennae for transmitting and receiving various types of wireless signals are being provided in vehicles. Various types of wireless signals received through antennae include global navigation satellite system (GNSS) signals for utilizing location-based systems, analog broadcasts such as FM/AM, and digital multimedia broadcast (DMB) signals for watching digital broadcasts in vehicles, and various wireless signals that are not mentioned.

Drivers may use various services in real time through wireless signals received through the antennae provided in the vehicles. Furthermore, it is expected that various new communication services will be added. The provision of various services is being considered, such as assisting a driver in driving a vehicle safely through a vehicle-to-vehicle communication (V2V) technology capable of enhancing driving safety so that the driver receives information necessary for driving in real time via a wireless network, or notifying the driver in advance of a collision with an approaching vehicle based on the information obtained through communication between roadside devices and surrounding vehicles.

The antenna efficiency of an antenna refers to a ratio of power input to the antenna and power radiated from the antenna. If all of the power input to the antenna is radiated into the air through a shark antenna, the efficiency is 100%.

However, 100% antenna efficiency may be achieved only by an ideal model, and actual antenna efficiency decreases due to various loss factors. The loss factors that typically occur in designing antennae include conduction loss, dielectric loss, impedance mismatch loss, antenna coupling loss, and the like.

In many cases where vehicle antennae are designed, a plurality of antennae are designed in a limited space due to spatial constraints. In these cases, the antennae are disposed at an electrically close distance, causing coupling therebetween, which is a loss factor that hinders radiation from the antennae.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle antenna configured for improving radio reception performance by improving antenna performance in a diversity antenna for a vehicle.

An exemplary embodiment of the present disclosure provides a vehicle antenna including: a glass antenna provided on a rear glass of a vehicle to transmit and receive a wireless signal; a roof antenna provided at an end portion of a roof panel of the vehicle to transmit and receive a wireless signal; and a transparent conductive film attached to the roof panel opposite to the roof antenna and including a pattern formed thereon to improve coupling between the glass antenna and the roof antenna.

The glass antenna and the roof antenna may use a vehicle body of the vehicle as a common ground, and the pattern may be a defected ground structure (DGS) pattern.

The glass antenna and the roof antenna may be implemented with separate grounds, and the pattern may be a split ring resonator (SRR) pattern.

The transparent conductive film may be a conductive film using a multi-layered electrode film (MLF) which is a transparent electrode.

The transparent conductive film may be a conductive film using a metal mesh film (MMF) which is a transparent electrode.

According to an exemplary embodiment of the present disclosure, radio reception performance may be improved by improving antenna performance in a diversity antenna for a vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1A:
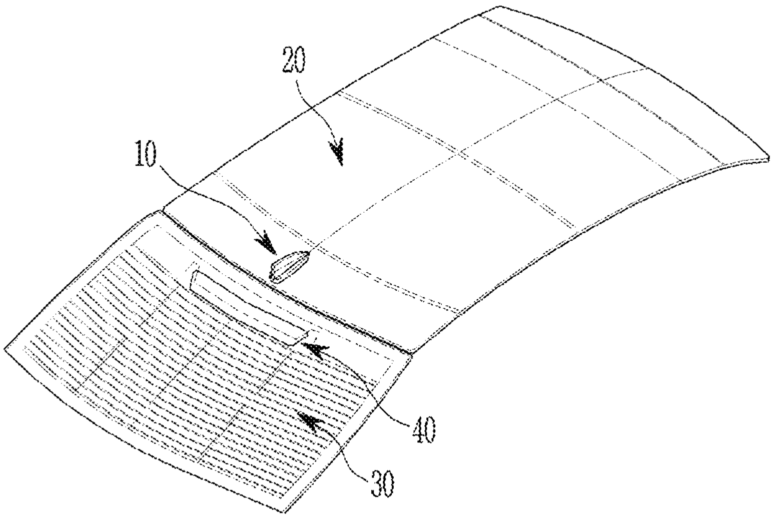
FIG. 1A and FIG. 1B are diagrams illustrating an example of a typical vehicle antenna provided in a vehicle.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings, so that they may be easily carried out by those of ordinary skill in the art to which the present disclosure pertains. However, the present disclosure may be implemented in various different forms and is not limited to the exemplary embodiments described herein. To clearly explain the present disclosure, parts irrelevant to the description will be omitted, and like elements will be denoted by like reference signs throughout the specification.

Throughout the specification, when a certain part is referred to as "including" a certain component, this implies the presence of other components, not precluding the presence of other components, unless explicitly stated to the contrary.

Hereinafter, various types of vehicle antennae according to exemplary embodiments of the present disclosure will be described with reference to the drawings. Before describing exemplary embodiments of the present disclosure, a typical vehicle antenna will be described with reference to FIG. 1.

Figure 1B:
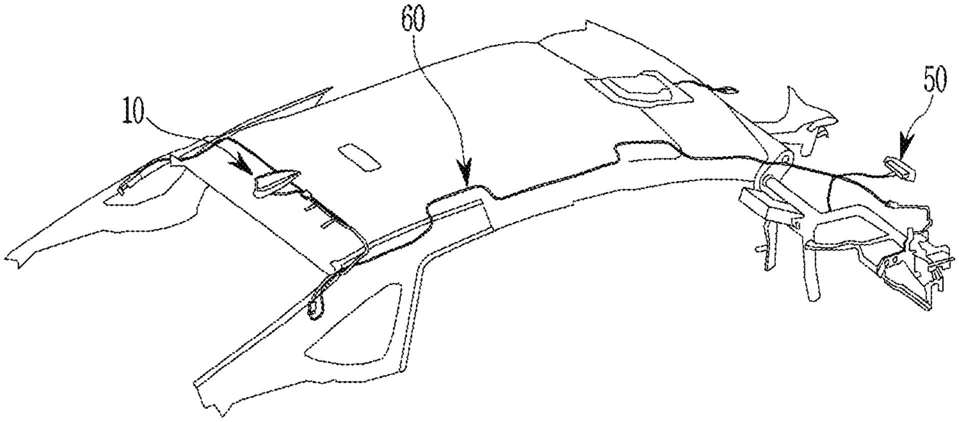

FIG. 1A and FIG. 1B are diagrams illustrating an example of a typical vehicle antenna provided in a vehicle.

In general, in many cases where vehicle antennae are designed, a plurality of antennae are designed in a limited space due to spatial constraints. In a case where a plurality of vehicle antennae are placed in a limited space, the vehicle antennae are disposed at an electrically close distance, causing coupling therebetween, which is a loss factor that hinders radiation from the antennae.

Vehicle antennae may be classified into built-in antennae, external antennae, and roof antennae depending on the locations where the antennae are disposed.

As illustrated in FIG. 1A, a typical vehicle antenna is a monopole-based antenna, and is also called a shark antenna 10 because it is built in a form of a printed circuit board (PCB) inside a shark fin case. A roof panel 20 of a vehicle body operates as a ground plane for the vehicle antenna 10.

The shark antenna 10 is attached to an end portion of the roof where the roof panel 20 meets a rear glass 30. Furthermore, a glass antenna 40 may be additionally formed on the rear glass 30 of the vehicle.

As illustrated in FIG. 1B, vehicle antennae may be classified into the shark antenna 10, which is an external antenna, an internal antenna 50, etc., depending on the locations where the antennae are disposed. A plurality of antennae may be disposed in one space depending on the services and frequencies of the respective antennae.

As described above, several antennae may be disposed in one space depending on the services and frequencies of the respective antennae. For example, as external antennae, an antenna for a radio, an antenna for a global navigation satellite system (GNSS), an antenna for a sapphire blue pearl (SXM), an antenna for a connected car service (CCS), and the like are built inside the shark fin-shaped cover together. Furthermore, as a built-in antenna 50, a CCS or an emergency call (eCall) antenna may be built inside a plastic cover. The shark antenna 10 and the built-in antenna 50 are connected to each other through a feeder cable 60.

The shark antenna 10 is implemented by designing multiple band antennae in a PCB type inside a cover of a predetermined shape. On the other hand, the glass antenna 40 is implemented by patterning an antenna signal line with a thin conducting wire while using the glass of the vehicle as an antenna substrate. For AM/FM radio, the rear glass of the vehicle is commonly used because a low frequency is used and a sufficiently large space is required to design an antenna.

In a general radio antenna, a transmitter and a receiver are fixed, and accordingly, the channel environment does not change significantly. However, in the case of vehicle radio, a transmitter for transmission from a transmission station is fixed, while a receiver, which is a driving vehicle, mostly moves. Accordingly, the channel environment also changes continuously, and these changes in channel environment affect the radio reception performance of the vehicle.

Figure 2A:
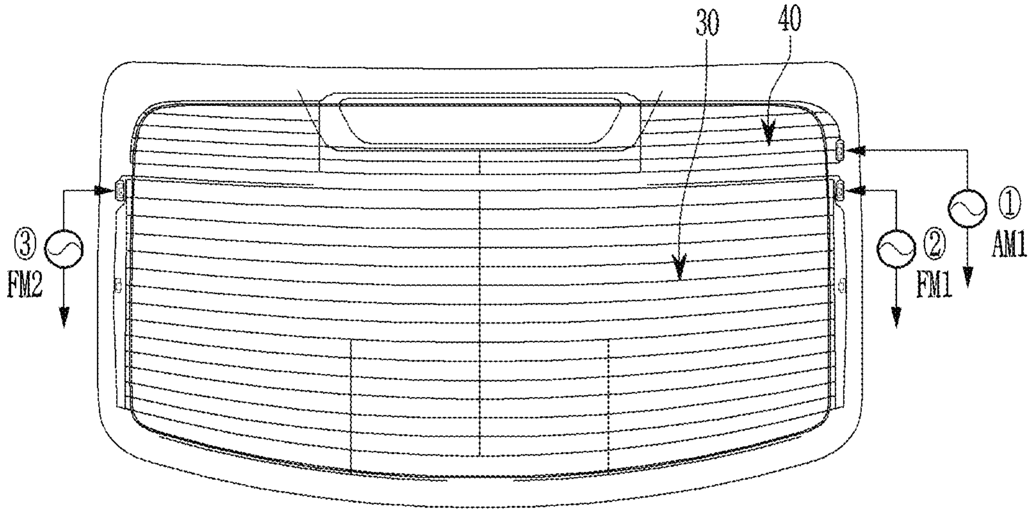
FIG. 2A and FIG. 2B are diagrams illustrating an example of a typical glass antenna and an example of a typical roof antenna for a vehicle.
Figure 2B:
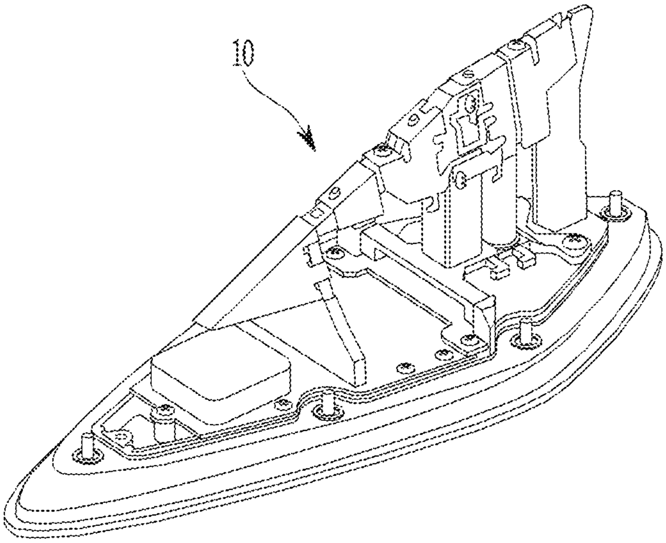

FIG. 2A and FIG. 2B are diagrams illustrating an example of a typical glass antenna and an example of a typical roof antenna for a vehicle.

As illustrated in FIG. 2A, vehicles each including the glass antenna 40 built in the rear glass 30 to receive AM radio and FM radio are being mass-produced. The specifications of the built-in glass antenna 40 may vary depending on the type of vehicle and the specifications of the infotainment platform, and the glass antenna 40 may include an AM antenna (①) for AM radio reception and a diversity antenna (FM1+FM2) constituted by several FM antennae (② and ③) for FM radio reception.

Furthermore, as illustrated in FIG. 2B, in the case of the shark antenna 10, feeding circuits are formed on a printed circuit board provided in the shark antenna 10 for various service bands such as AM/FM signals, DMB signals, Global Positioning System (GPS) signals, and CCS signals. Furthermore, a chip antenna, which is an antenna for transmitting and receiving Global Positioning System (GPS) signals or CCS signals, may be coupled to a portion of the printed circuit board, and the chip antenna may be electrically coupled to the feeding circuit for feeding GPS signals or CCS signals.

Even though many antennae are configured in the vehicle in the present manner, when a driver receives signals while driving the vehicle in an urban area with many trees or buildings, an inflow of noise and a decrease in signal to noise ratio (SNR) may occur due to multipath fading. The inflow of noise and the decrease in SNR may lead to a deterioration in radio reception quality of the vehicle.

Therefore, the exemplary embodiments of the present disclosure propose a method of improving radio reception performance by improving the performance of a diversity antenna that receives and processes signals using two antennae in the same frequency band.

That is, it is required to consider coupling between different antennae to improve antenna efficiency. Therefore, the exemplary embodiments of the present disclosure propose a method capable of improving efficiency or minimizing efficiency loss by improving coupling between antennae in a vehicle antenna arrangement structure.

Figure 3:
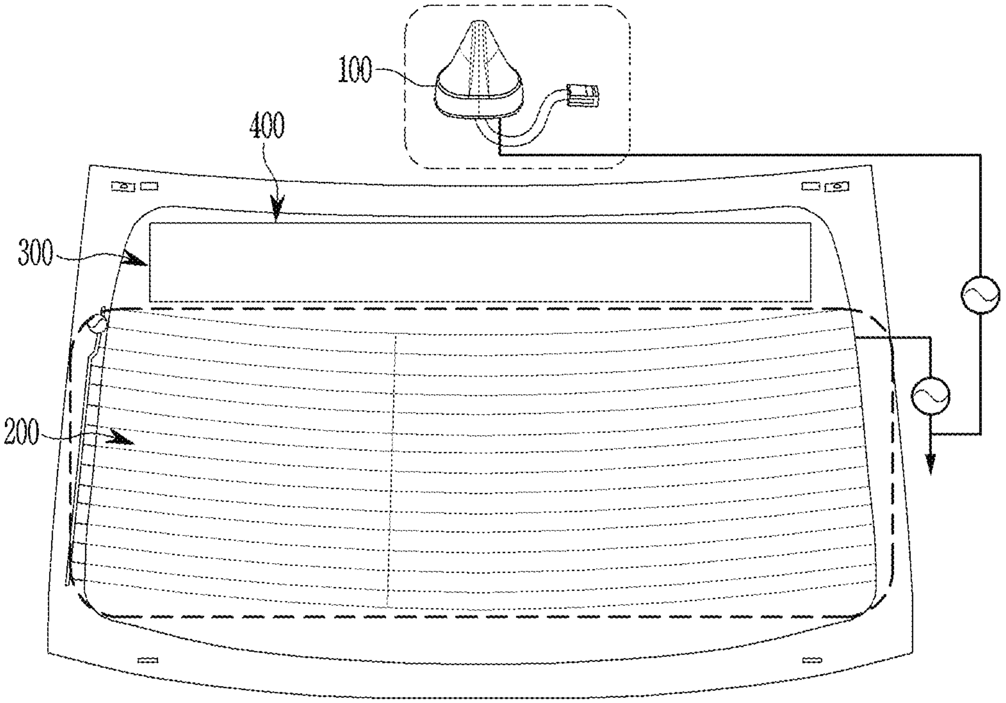
FIG. 3 is a diagram illustrating an example of a vehicle antenna according to an exemplary embodiment of the present disclosure.

FIG. 3 is a diagram illustrating an example of a vehicle antenna according to an exemplary embodiment of the present disclosure.

As illustrated in FIG. 3, in the exemplary embodiment of the present disclosure, a plurality of vehicle antennae are disposed on a roof and a rear glass of a vehicle to provide various services.

In an exemplary embodiment of the present disclosure, a roof antenna 100 is disposed on the roof of the vehicle, and a glass antenna 200 is disposed on the rear glass of the vehicle as an example. In an exemplary embodiment of the present disclosure, the roof antenna 100 and the glass antenna 200 are referred to as vehicle antennae, but they are not necessarily limited thereto.

A 4G antenna for CCS is built in the roof antenna 100, and an AM/FM antenna for radio reception is built in the glass antenna 200. However, if new antennae are added, it is assumed that, for example, a 5G Multiple-In Multiple-Out (MIMO) antenna or a Digital Audio Broadcasting (DAB) antenna is added. Accordingly, the 5G MIMO antenna may be additionally built in the roof antenna 100, and the DAB antenna may be additionally built in the glass antenna 200.

In general, mutual interference between antennae may be sorted as coupling through radiation in the air and coupling through surface current at the common ground between antennae. Therefore, in an exemplary embodiment of the present disclosure, coupling between antennae may be improved through an area for improving coupling between antennae disposed on the rear glass as illustrated in FIG. 3, based on a factor such as coupling through radiation in the air or coupling through surface current at the common ground between antennae.

In an exemplary embodiment of the present disclosure, to improve coupling between antennae and secure rear visibility, a transparent conductive film 300 is applied to the area for improving coupling between antennae as an example. That is, in an exemplary embodiment of the present disclosure, to improve coupling between the roof antenna 100 and the glass antenna 200, the transparent conductive film 300 is used as an area for improving coupling between antennae.

To improve coupling between vehicle antennae, a predetermined pattern 400 is formed on the transparent conductive film 300 according to an exemplary embodiment of the present disclosure. Furthermore, the transparent conductive film 300 may include a plurality of components among a substrate, a transparent conducting wire, a transparent electrode, and wiring. Here, the transparent conductive film may be produced in various ways, the exemplary embodiments of the present disclosure is not limited to one method.

In an exemplary embodiment of the present disclosure, a transparent conductive film using a multi-layered electrode film (MLF), which is a transparent electrode, may be used. Alternatively, a transparent conductive film using a metal mesh film (MMF), which is a transparent electrode, may be used.

Here, the pattern 400 is formed on the transparent electrode and the substrate, which are components of the transparent conductive film 300. As the pattern 400, a pattern in a defected ground structure (DGS) or a pattern in a resonator type such as a split ring resonator (SRR) may be used, depending on whether the two antennae 100 and 200 use a common ground or separate grounds.

The pattern 400 is formed by etching a partial area of a metal film attached to the substrate of the transparent conductive film 300. The pattern 400 is formed to elongate horizontally in a longitudinal direction of the transparent conductive film 300 as an example.

Furthermore, the etching area for the pattern 400 is formed in a rectangular shape as an exemplary embodiment of the present disclosure, but the etching area may be formed in a polygonal or curved shape such as a quadrangular shape, an oval shape, a circular shape, or a diamond shape, and the metal area may also be formed in the same shape as the etching area. Because the method of forming the pattern 400 or the material of the metal film used to form the pattern 400 may be implemented in various forms as described above, the exemplary embodiments of the present disclosure are not limited to one method or material.

Here, the transparent conductive film 300 on which the pattern 400 is formed and the vehicle antenna may be implemented in two forms according to the ground structures of the roof antenna 100 and the glass antenna 200.

Furthermore, by use of a metamaterial in the pattern 400, the transmission/reflection characteristics of radio waves may be adjusted utilizing a periodic array structure. At the instant time, the metamaterial is a general term for materials artificially synthesized to exhibit special electromagnetic properties that are not commonly found in the natural world, and the type of metamaterial is not limited to one type.

In an exemplary embodiment of the present disclosure, interference between antennae may be minimized using the metamaterial. That is, in the case of common ground, the defected ground structure (DSG) was used to design the antennae so that their ground currents have reflection characteristics with respect to each other in a specific frequency band. Furthermore, in the case of separate grounds, the split ring resonator (SRR) structure was applied to design the antennae so that their electromagnetic waves have reflection characteristics with respect to each other in the air in a specific frequency band. This will be described with reference to FIG. 4 and FIG. 5.

Figure 4:
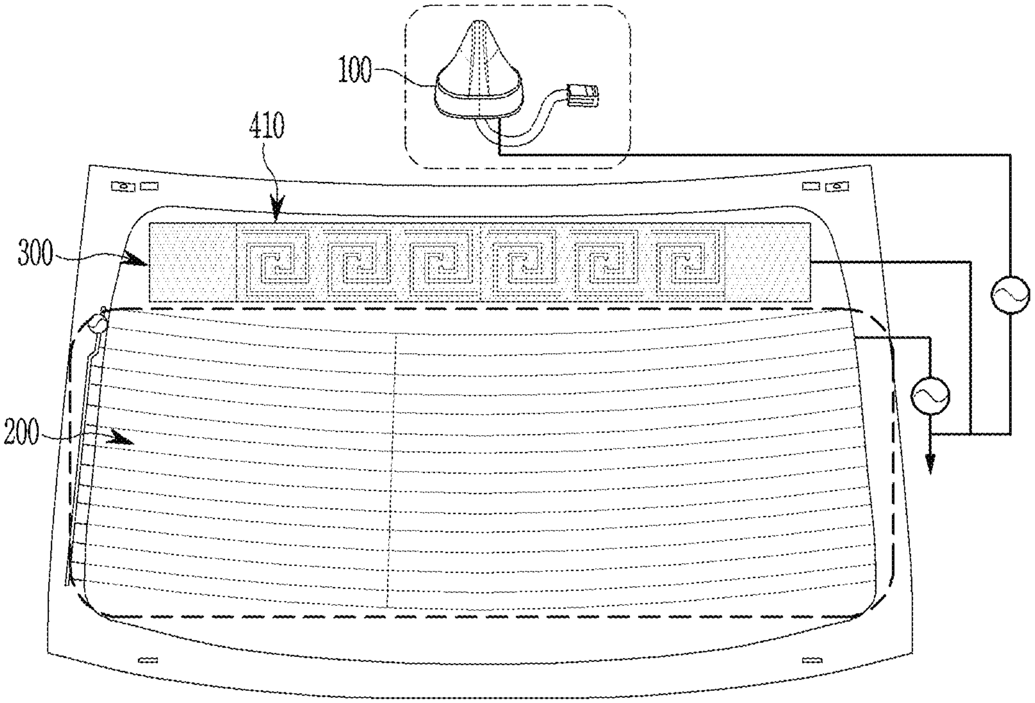
FIG. 4 is a diagram illustrating an example of a vehicle antenna using a common ground according to various exemplary embodiments of the present disclosure.
Figure 5:
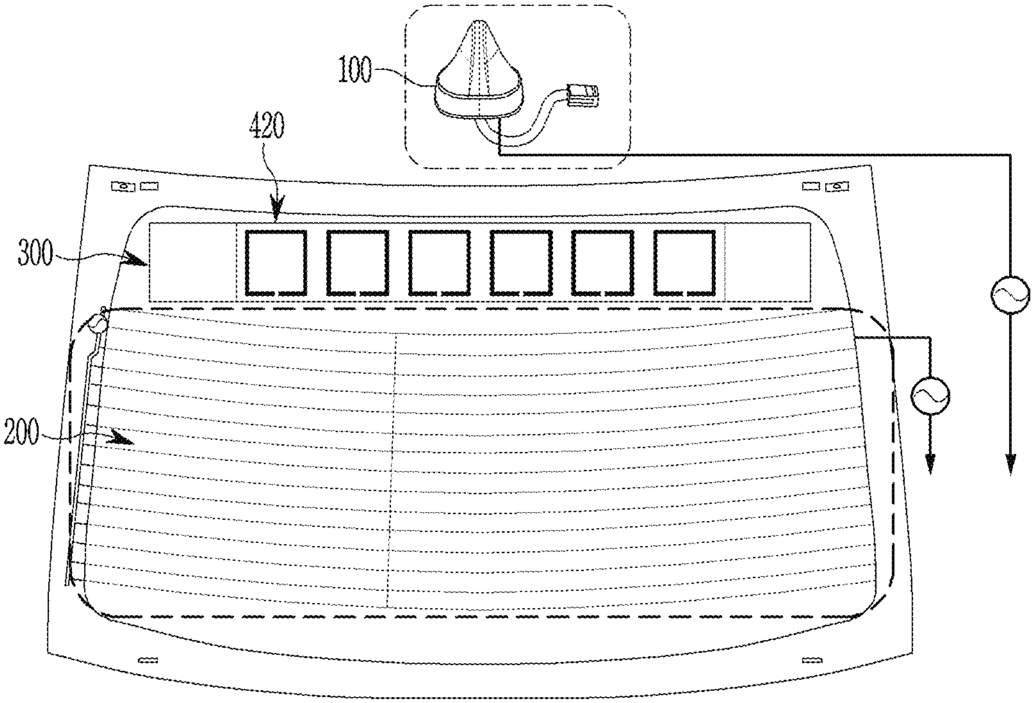
FIG. 5 is a diagram illustrating an example of a vehicle antenna using separate grounds according to various exemplary embodiments of the present disclosure.

FIG. 4 is a diagram illustrating an example of a vehicle antenna using a common ground according to various exemplary embodiments of the present disclosure, and FIG. 5 is a diagram illustrating an example of a vehicle antenna using separate grounds according to various exemplary embodiments of the present disclosure.

Electrical components used in the vehicle generally use the vehicle body as a ground. Therefore, as illustrated in FIG. 4, the vehicle antenna may be implemented in a common ground structure in which both the roof antenna 100 and the glass antenna 200 use the vehicle body as a ground.

When the two antennae use a common ground, a DSG pattern 410 may be formed on the transparent conductive film 300 to minimize coupling through ground current therebetween.

On the other hand, as illustrated in FIG. 5, in a case where the vehicle antenna is implemented with separate grounds for the roof antenna 100 and the glass antenna 200, coupling through ground current between the two antennae is minimized by separating their grounds from each other. Furthermore, a pattern 420 in a resonator type such as an SRR is formed using the transparent conductive film 300 to minimize radiation-based coupling.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

In exemplary embodiments of the present disclosure, “at least one of A and B” may refer to “at least one of A or B”

or "at least one of combinations of one or more of A and B". In addition, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle antenna comprising:

a glass antenna provided on a rear glass of a vehicle to transmit and receive a wireless signal;

a roof antenna provided at an end portion of a roof panel of the vehicle to transmit and receive a wireless signal; and a transparent conductive film attached to the roof panel opposite to the roof antenna and including a pattern formed on the transparent conductive film, wherein the pattern is at least one of a defected ground structure (DGS) pattern and a split ring resonator (SRR) pattern to suppress mutual interference between the glass antenna and the roof antenna.

2. The vehicle antenna of claim 1, wherein the glass antenna and the roof antenna use a vehicle body of the vehicle as a common ground.

3. The vehicle antenna of claim 1, wherein the glass antenna and the roof antenna are implemented with separate grounds.

4. The vehicle antenna of claim 1, wherein the transparent conductive film is a conductive film using a multi-layered electrode film (MLF) which is a transparent electrode.

5. The vehicle antenna of claim 1, wherein the transparent conductive film is a conductive film using a metal mesh film (MMF) which is a transparent electrode.

* * * * *